(12) United States Patent
Tangeland et al.

(10) Patent No.: US 10,708,544 B2
(45) Date of Patent: *Jul. 7, 2020

(54) GROUP AND CONVERSATIONAL FRAMING FOR SPEAKER TRACKING IN A VIDEO CONFERENCE SYSTEM

(71) Applicant: Cisco Technology, Inc., San Jose, CA (US)

(72) Inventors: Kristian Tangeland, Oslo (NO); Rune Oistein Aas, Lysaker (NO); Christian Fjelleng Theien, Asker (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,191

(22) Filed: Feb. 27, 2019

(65) Prior Publication Data

US 2019/0199967 A1 Jun. 27, 2019

Related U.S. Application Data

(63) Continuation of application No. 15/908,984, filed on Mar. 1, 2018, now Pat. No. 10,257,465, which is a continuation of application No. 15/581,120, filed on Apr. 28, 2017, now Pat. No. 9,942,518.

(60) Provisional application No. 62/464,495, filed on Feb. 28, 2017.

(51) Int. Cl.
*H04N 7/15* (2006.01)
*H04N 7/14* (2006.01)
*G06K 9/62* (2006.01)
*G06K 9/00* (2006.01)
*G10L 21/0272* (2013.01)

(52) U.S. Cl.
CPC ......... *H04N 7/152* (2013.01); *G06K 9/00228* (2013.01); *G06K 9/6218* (2013.01); *G06K 9/6223* (2013.01); *G10L 21/0272* (2013.01); *H04N 7/147* (2013.01)

(58) Field of Classification Search
CPC ........ H04N 7/152; H04N 7/147; G10L 25/78; G10L 21/0272; G06K 9/6218
See application file for complete search history.

(56) References Cited

U.S. PATENT DOCUMENTS

| 7,460,150 | B1 | 12/2008 | Coughlan et al. |
| 9,398,258 | B1 | 7/2016 | Sandvik et al. |
| 9,479,730 | B1 | 10/2016 | Noll |

(Continued)

*Primary Examiner* — Stella L. Woo
(74) *Attorney, Agent, or Firm* — Edell, Shapiro & Finnan, LLC

(57) ABSTRACT

In one embodiment, a method is provided to intelligently frame groups of participants in a meeting. This gives a more pleasing experience with fewer switches, better contextual understanding, and more natural framing, as would be seen in a video production made by a human director. Furthermore, in accordance with another embodiment, conversational framing techniques are provided. During speaker tracking, when two local participants are addressing each other, a method is provided to show a close-up framing showing both participants. By evaluating the direction participants are looking and a speaker history, it is determined if there is a local discussion going on, and an appropriate framing is selected to give far-end participants the most contextually rich experience.

20 Claims, 9 Drawing Sheets

FIG.9

(56) References Cited

U.S. PATENT DOCUMENTS

| | | | |
|---|---|---|---|
| 9,942,518 B1 | 4/2018 | Tangeland et al. | |
| 10,257,465 B2* | 4/2019 | Tangeland | H04N 7/152 |
| 2008/0218582 A1* | 9/2008 | Buckler | H04N 7/15 |
| | | | 348/14.08 |
| 2009/0015658 A1 | 1/2009 | Enstad et al. | |
| 2010/0123770 A1 | 5/2010 | Friel et al. | |
| 2011/0285809 A1* | 11/2011 | Feng | G06K 9/00234 |
| | | | 348/14.16 |
| 2012/0293606 A1* | 11/2012 | Watson | H04N 5/232 |
| | | | 348/14.16 |
| 2014/0270343 A1 | 9/2014 | Sanaullah et al. | |
| 2015/0049162 A1 | 2/2015 | Kurupacheril et al. | |
| 2016/0050245 A1 | 2/2016 | Huang et al. | |
| 2016/0173821 A1 | 6/2016 | De Magalhaes | |
| 2017/0099459 A1 | 4/2017 | Nimri et al. | |
| 2017/0099461 A1 | 4/2017 | Nimri et al. | |
| 2018/0249124 A1 | 8/2018 | Tangeland et al. | |

\* cited by examiner

GROUP AND CONVERSATIONAL FRAMING FOR SPEAKER TRACKING IN A VIDEO CONFERENCE SYSTEM

CROSS-REFERENCE TO RELATED APPLICATIONS

This application is a continuation of U.S. patent application Ser. No. 15/908,984, filed on Mar. 1, 2018, and entitled "GROUP AND CONVERSATIONAL FRAMING FOR SPEAKER TRACKING IN A VIDEO CONFERENCE SYSTEM," which is a continuation of, and claims priority to, U.S. patent application Ser. No. 15/581,120, filed on Apr. 28, 2017, and entitled "GROUP AND CONVERSATIONAL FRAMING FOR SPEAKER TRACKING IN A VIDEO CONFERENCE SYSTEM," which claims priority to U.S. Provisional Application No. 62/464,495, entitled "GROUP AND CONVERSATIONAL FRAMING FOR SPEAKER TRACKING IN A VIDEO CONFERENCE SYSTEM", filed Feb. 28, 2017, the entireties of which are incorporated herein by reference.

TECHNICAL FIELD

The present disclosure relates to switching between camera views in a video conference system.

BACKGROUND

A video conference system includes an endpoint that captures audio and video of participants in a room during a conference, for example, and then transmits the audio and video to a conference server or to a "far-end" endpoint. The video conference system may frame close-up or zoomed-in camera views of talking participants (i.e., talkers). The video conference system may detect faces in the captured video to assist with framing the close-up camera views. Speaker tracking improves the meeting experience by showing close-up views of the active speakers.

DESCRIPTION OF EXAMPLE EMBODIMENTS

Overview

In one embodiment, a video conference endpoint may include one or more cameras and a microphone array. The video conference endpoint may be configured to detect a plurality of participants within a field of view of the video conference endpoint, and then calculate a proximity of each participant with respect to one or more other participants of the video conference endpoint. The video conference endpoint then groups the participants into one or more groups based on the calculated proximity such that the one or more groups include more than one participant. The video conference endpoint may further detect a first participant of a first group of the one or more groups as an active speaker, and then alter a framing of a video output of the video conference endpoint to frame the first group containing the active speaker.

Example Embodiments

In one embodiment, techniques are provided to intelligently frame one or more groups of participants in a video conference session. These techniques provide an improved experience with fewer camera framing switches, better contextual understanding, and more natural framing, as would be seen in a production made by a human director. Furthermore, in accordance with another embodiment, conversational framing techniques are provided. During speaker tracking, when two local participants are addressing each other, a method is provided to present a close-up framing showing both participants. By evaluating the direction participants are looking and the speaker tracking history, it can be determined if there is a local discussion occurring during the video conference session (meeting), and thus find an appropriate framing to give participants at a far-end endpoint the most contextually rich experience.

Figure 1:
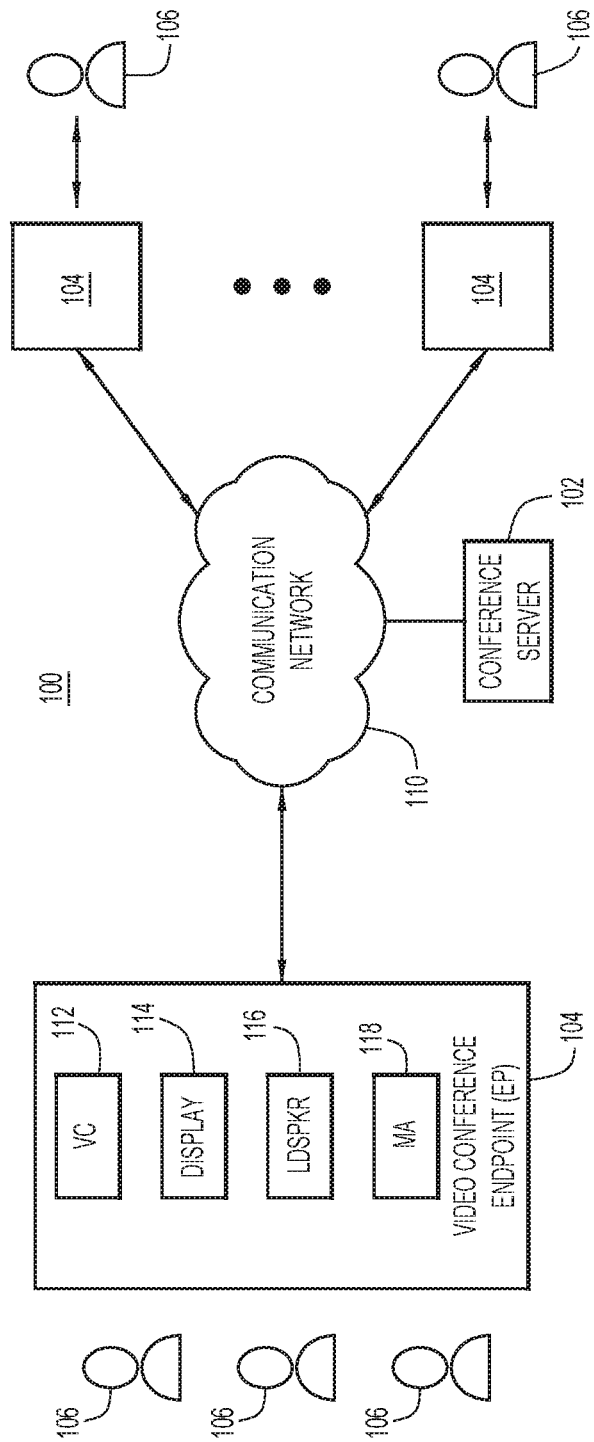
FIG. 1 is a block diagram of a video conference system in which a video conference endpoint automates switching between different camera views during a video conference, according to an example embodiment.

With reference to FIG. 1, there is depicted a block diagram of a video conference environment (system) 100 in which a video conference endpoint automates switching between different camera views to capture actively talking participants using speaker clustering. Video conference environment 100 includes two or more video conference endpoints 104 operated by local users/participants 106 and configured to establish audio-visual teleconference collaboration sessions with each other over a communication network 110. Communication network 110 may include one or more wide area networks (WANs), such as the Internet, and one or more local area networks (LANs). A conference server 102 may also be deployed to coordinate the routing of audio-video streams among the video conference endpoints.

Each video conference endpoint 104 may include one or more video cameras (VC) 112, a video display 114, a loudspeaker (LDSPKR) 116, and a microphone array (MA) 118. Endpoints 104 may be wired or wireless communication devices equipped with the aforementioned components, such as, but not limited to laptop and tablet computers, smartphones, etc. In a transmit direction, endpoints 104 capture audio/video from their local participants 106 with MA 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114.

Figure 2:
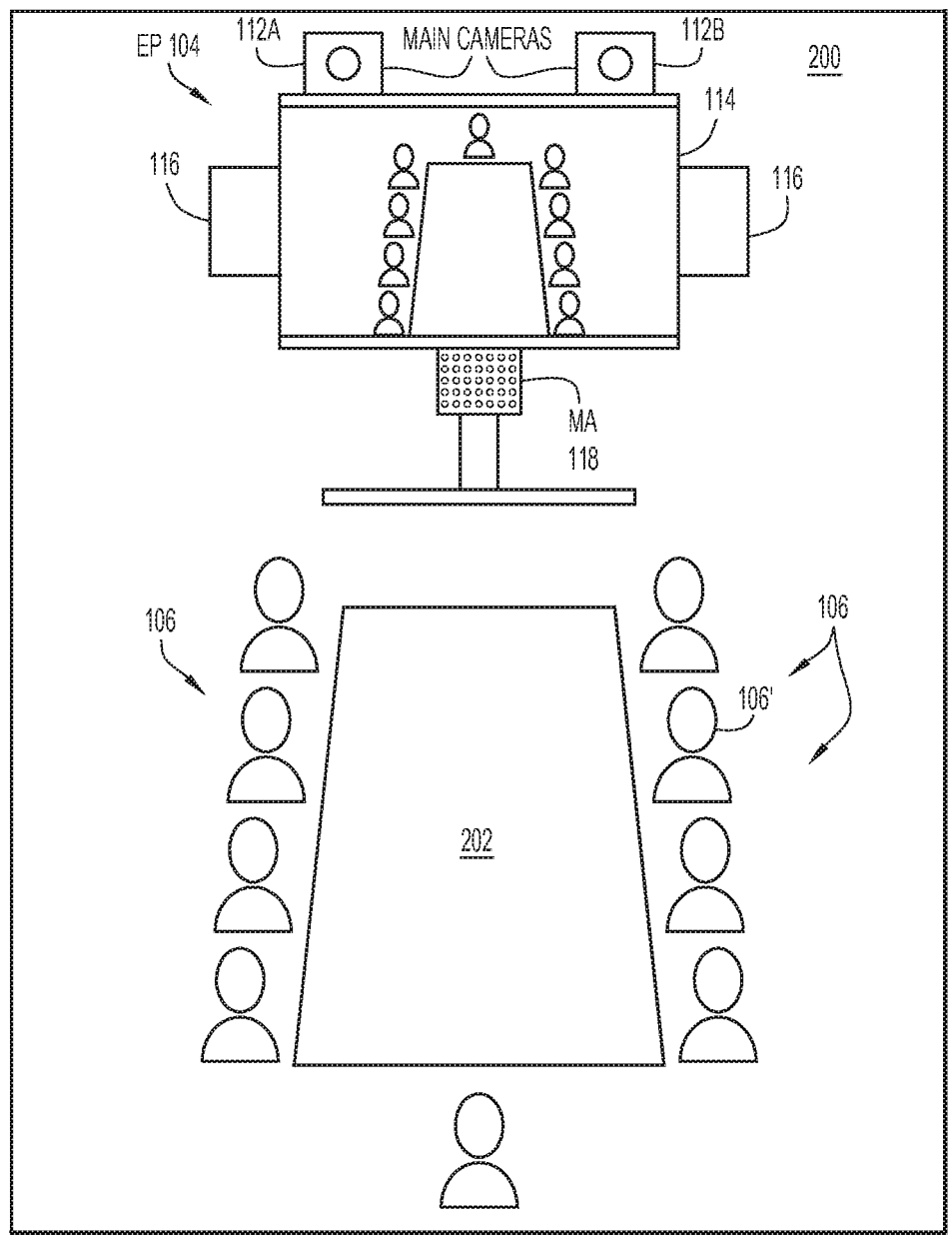
FIG. 2 is an illustration of video conference endpoint deployed in a conference room in which there are multiple meeting participants sitting around a conference table, according to an example embodiment.

Referring now to FIG. 2, there is an illustration of video conference endpoint 104 deployed in a conference room 200 (depicted simplistically as an outline in FIG. 2), according to an embodiment. Video conference endpoint 104 includes main or center video cameras 112A and 112B positioned proximate and centered on display 114. Each of cameras 112 typically includes pan, tilt, and zoom (PTZ) features that may be implemented mechanically and/or digitally. Endpoint 104 controls the pan, tilt, and zoom features of each of the cameras 112A and 112B (collectively referred to as "cameras 112") to capture video of different views/scenes of participants 106 seated around a conference table 202 opposite from or facing (i.e., in front of) the cameras (and display 114), including a participant 106' who is actively talking. The combination of two video cameras depicted in FIG. 2 is only one example of many possible camera combinations that may be used, as would be appreciated by one of ordinary skill in the relevant arts having read the present description. As depicted in the example of FIG. 2, MA 118 is positioned adjacent to, and centered along, a bottom side of display 114 (i.e., below the display) so as to receive audio from participants 106 and 106' in room 200.

The cameras 112A and 112B and the MA 118 collectively form a speaker tracking system configured to automatically locate and zoom in on an active speaker in the near-end the endpoint 104. In accordance with techniques presented herein, video conference endpoint 104 (i) detects participant faces and face positions based on video captured with cameras 112A and 112B, (ii) detects positions of talking participants (i.e., "talkers", "active speakers", etc.) based on audio detected by MA 118, and (iii) performs group-based speaker tracking as described below. Based on the detected faces and face positions, the detected active speaker positions, and results of the speaker clustering, video conference endpoint 104 automatically controls cameras 112A and 112B to capture video of different camera views of participants 106; more specifically, the endpoint controls cameras 112A and 112B to switch between different camera views (referred to more simply as "views") in which video is captured.

Group Framing

Current speaker tracking solutions focus on framing the current speaker only, resulting in several challenges. First, the active speaker is selected and this reduces the far-end spectators'/attendees' ability to understand the context of the meeting, such as to see reactions and body language of other participants. Second, to far-end meeting participants, people sitting close together are perceived as a group. Not seeing the whole group can be distracting to the far-end spectators.

Figure 3:
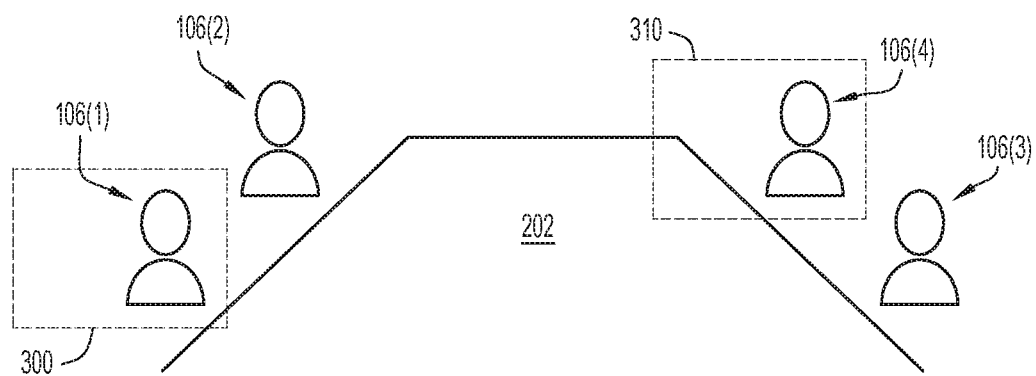
FIG. 3 is a diagram that illustrates an example of meeting participants for which the group framing techniques presented herein may be employed, according to an example embodiment.

FIG. 3 illustrates an example scenario in which four participants 106(1)-106(4) are seated around table 202. It is to be understood that FIG. 3 is drawn to a scale that purposefully and intentionally conveys the relative distances/proximities between each of the participants 106(1)-106(4) around table 202. With reference to FIG. 3, and continued reference to FIGS. 1 and 2, if none of participants 160(1)-106(4) are actively speaking, the video output of video cameras 112A and/or 112B may frame all of the participants 106(1)-106(4). However, if, for example, participant 106(1) is speaking, the video output by video cameras 112A and/or 112B may be a close-up framing 300 of participant 106(1), which could include the empty space to the left of participant 106(1), especially when composing a framing that avoids cutting off the face of participant 106(2). In addition, if participant 106(4) begins talking, the video output by video cameras 112A and/or 112B may switch to be a close-up framing 310 of participant 106(4), which may include the empty space and portion of table 202 to the left of participant 106(4) when composing a framing based on the rule of thirds.

In one solution presented herein, a method for grouping nearby participants is provided such that, when appropriate, the current or active speaker is framed together with other participants in the same group. A group is defined as participants that are sitting nearby, or within proximity of, each other such that the participants of a group can be framed together, without including participants of another group, and the one or more participants in a group appear with an appropriate size and margin in the resulting video output.

Figure 4:
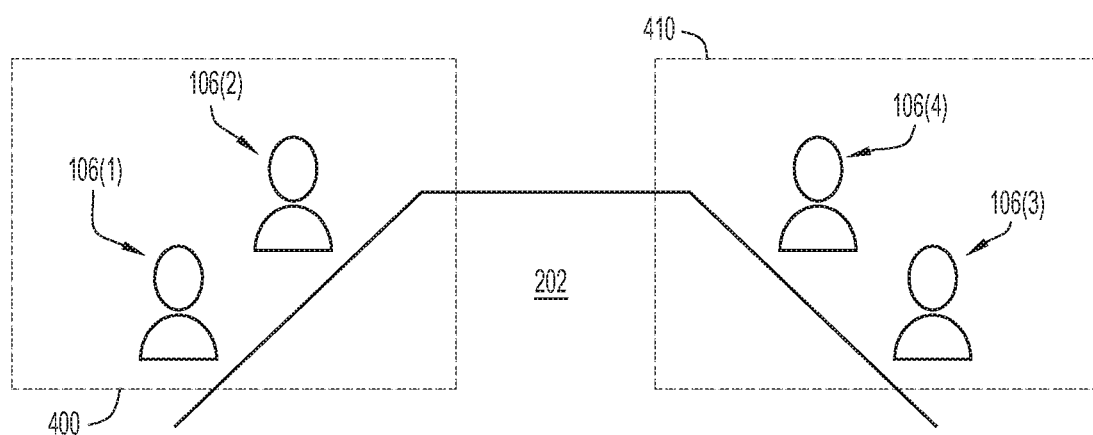
FIGS. 4 and 5 illustrate the group framing techniques for the example depicted in FIG. 3, according to an example embodiment.

With reference to FIG. 4, and continued reference to FIGS. 1 and 2, an example is shown of how participants 106(1)-106(4) in a meeting may be grouped according to these techniques. FIG. 4 illustrates participants 106(1)-106 (4) seated around table 202 of an endpoint 104. It is to be understood that FIG. 4 is drawn to a scale that purposefully and intentionally conveys the relative distances/proximities between each of the participants 106(1)-106(4) around table 202. As illustrated, participant 106(1) is closer in proximity to participant 106(2) than participants 106(3), 106(4) that are seated across table 202. Similarly, participant 160(3) is closer in proximity to participant 106(4) than participants 106(1), 106(2), which are seated across table 202. Thus, participants 106(1), 106(2) may be grouped together to form a first group, while participants 106(3), 106(4) may be grouped together to form a second group. If either of participant 106(1) or participant 106(2) begins speaking, framing 400 would be chosen which includes both participants 106(1), 106(2) of the first group, instead of only framing the participant that is actively speaking or framing all of the participants (i.e., participants 106(1)-106(4)) of the endpoint 104. For example, if participant 106(1) of FIG. 4 begins speaking, framing 400 would be chosen for the first group, which includes both the active speaker (e.g., participant 106(1)) and other participants forming the first group with the active speaker (e.g., participant 106(2)). Thus, in this example, participants 106(3), 106(4) would not be within the framing 400 of the video output of the video cameras 112 while participant 106(1) is actively speaking. Similarly, if either of participant 106(3) or participant 106(4) begins speaking, framing 410 would be chosen, which includes both participants 106(3), 106(4) of the second group, instead of only framing the participant that is actively speaking or framing all of the participants (e.g., participants 106(1)-106(4)) of the endpoint 104. For example, if participant 106(4) of FIG. 4 begins speaking, framing 410 would be chosen for the second group, which includes both the active speaker (e.g., participant 106(4)) and other participants forming the second group with the active speaker (e.g., participant 106(3)). Thus, in this example, participants 106 (1) and 106(2) would not be within the framing of the video output of the video cameras 112 while participant 106(4) is actively speaking.

Figure 5:
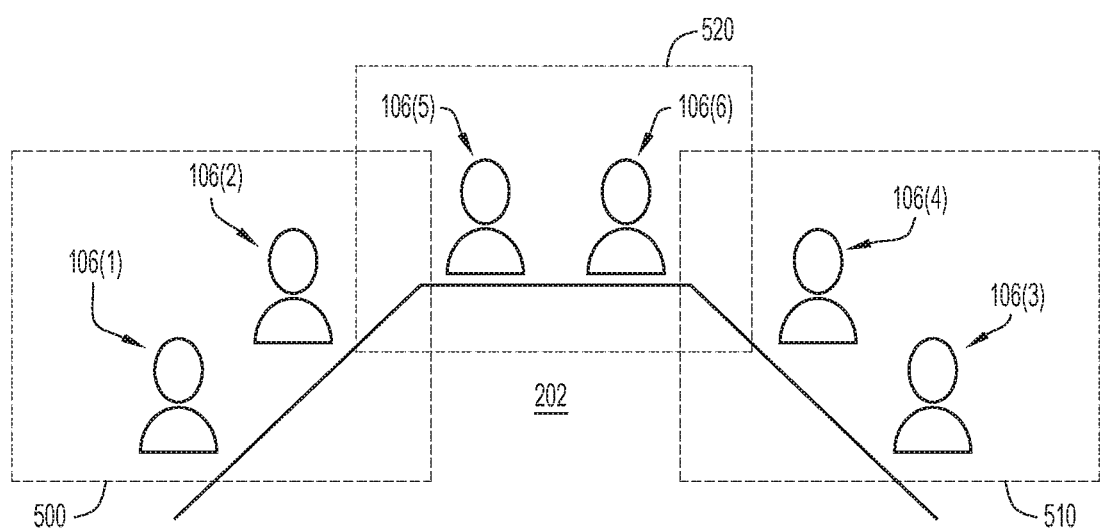

With reference to FIG. 5, and continued reference to FIGS. 1 and 2, another example is shown of how participants 106(1)-106(6) in a meeting may be grouped according to these techniques. FIG. 5 illustrates participants 106(1)-106

(6) seated around table 202 of endpoint 104. It is to be understood that FIG. 5 is drawn to a scale that purposefully and intentionally conveys the relative distances/proximities between each of the participants 106(1)-106(6) around table 202. As illustrated, participant 106(1) is closer in proximity to participant 106(2) than participants 106(3)-106(6). Similarly, participant 160(3) is closer in proximity to participant 106(4) than participants 106(1) and 106(2), and 106(5) and 106(6). Furthermore, participant 106(5) is closer in proximity to participants 106(6) than participants 106(1)-106(4). While participant 106(2) is closer in proximity to participant 106(5) than participants 106(3), 106(4), 106(6), participant 106(2) is still closer in proximity to participant 106(1) than to participant 106(5). Moreover, while participant 106(4) is closer in proximity to participant 106(6) than participants 106(1) and 106(2), 106(5), participant 106(4) is still closer in proximity to participant 106(3) than to participant 106(6). Thus, participants 106(1) and 106(2) may be grouped together to form a first group, participants 106(3) and 106(4) may be grouped together to form a second group, and participants 106(5) and 106(6) may be grouped together to form a third group. Because the endpoint 104, as will be further described below, determines that the participants 106(1)-106(6) illustrated in FIG. 5 are best grouped into three groups, participant 106(2) is included in the first group with participant 106(1), participant 106(4) is included in the second group with participant 106(3), and participants 106(5), 106(6) are included in the third group together. While not illustrated, if the endpoint 104 determined that the participants 106(1)-106(6) illustrated in FIG. 5 were best grouped into two groups, participants 106(1), 106(2), and 106(5) would form the first group, and participants 106(3), 106(4), and 106(6) would form the second group based on the proximity of participants with respect to one another.

If either of participant 106(1) or participant 106(2) begins speaking, the endpoint would select framing 500, which includes both participants 106(1) and 106(2) of the first group, instead of only framing the participant that is actively speaking or framing all of the participants (e.g., participants 106(1)-106(6)). For example, if participant 106(1) of FIG. 5 begins speaking, framing 500 would be chosen to show the first group, where framing 500 includes both the active speaker (i.e., participant 106(1)) and other participants forming the first group with the active speaker (i.e., participant 106(2)). When participant 106(1) is actively speaking and the video conference endpoint 104 selects framing 500, the video output of the video cameras 112A and/or 112B would not show participants 106(3)-106(6). Similarly, if either of participant 106(3) or participant 106(4) begins speaking, the endpoint 104 selects framing 510, which includes both participants 106(3) and 106(4) of the second group, instead of only framing the participant that is actively speaking or framing all of the participants (e.g., participants 106(1)-106(6)). For example, if participant 106(4) begins speaking, the endpoint would select framing 510 to show the second group, which includes both the active speaker (e.g., participant 106(4)) and other participants forming the second group with the active speaker (e.g., participant 106(3)). When participant 106(4) is actively speaking and the video conference endpoint 104 selects framing 510, the video output of video cameras 112A and/or 112B would not show participants 106(1), 106(2), 106(5), and 106(6). In addition, if either of participant 106(5) or participant 106(6) begins speaking, the endpoint would select framing 520, which includes both participants 106(5) and 106(6) of the third group, instead of only framing the participant that is actively speaking or framing all of the participants. For example, if participant 106(5) of FIG. 5 begins speaking, the endpoint would select framing 520 to show the third group, which includes both the active speaker (e.g., participant 106(5)) and other participants forming the third group with the active speaker (e.g., participant 106(6)). Thus, when participant 106(5) is actively speaking and the video conference endpoint selects framing 520, the video output of video cameras 112A and/or 112B would not show participants 106(1), 106(2), 106(5), and 106(6).

As explained above, while FIGS. 4 and 5 illustrate groups of two participants, it is to be understood that a group may include any number of participants 106 (e.g., more than two participants). Furthermore, the cameras 112A and 112B may produce a video output with a predetermined aspect ratio regardless of the framing completed by the cameras. When the video conference endpoint 104 does not contain an active speaker, the cameras 112A and 112B produce a video output with a predetermined or preset aspect ratio that includes all, or a majority of, the participants 106. Consequently, when the video conference endpoint 104 does contain an active speaker and the cameras 112A and 112B alter the framing of the video output to show only the group containing the active speaker, that framing of the group containing the active speaker has the same aspect ratio as the video output of the "wider view" that includes all of the participants of the video conference endpoint 104 (i.e., without an active speaker). In one example embodiment, the cameras 112A and 112B may always produce a video output with a 16:9 aspect ratio.

To perform the group framing described above in connection with FIGS. 4 and 5, the endpoint 104 may build a scene model of the participants located at the endpoint 104 based on inputs from the speaker tracking configuration depicted in FIGS. 1 and 2. The techniques utilized by the video conference endpoint 104 on the inputs include, but are not limited to face detection, upper body detection, motion detection, audio triangulation, etc. By processing and combining this data, a suitably accurate representation of the position of each of the participants within or near a video conference endpoint 104 can be obtained.

In one implementation, the video conference endpoint 104 may utilize a clustering algorithm to determine the number of groups in which to group the participants of a video conference endpoint 104. Any clustering algorithm may be utilized, including, but not limited to, hierarchical clustering models, a K-means clustering algorithm, multivariate normal distributions, etc. In one example embodiment, the video conference endpoint 104 may utilize a K-means algorithm with K values in a specified range to analyze the number of groups that best fits the number of participants of a video conference endpoint 104 and the proximity of each of the participants 106 with respect to one another. Multiple candidate solutions may be generated using a K-means clustering algorithm with random starting values for cluster means. In some situations or instances, the candidate solutions may be generated with a K-means algorithm where the values of K are 1, 2, or 3 (i.e., one group, two groups, or three groups).

Once multiple candidate solutions have been generated, the endpoint calculates a cost for each candidate solution based on three factors: a crop cost, a clustering cost, and a K cost. The crop cost is associated with the cropping or re-framing of the video output of the cameras for each group. A crop cost for a given group is assigned a higher cost if the cropped or reframed video output includes views of participants from another group. The clustering cost is associated with the proximity or distance of each participant with respect to each other participant of a video conference endpoint. In one example embodiment, in calculating the clustering cost, the video conference endpoint may sum the maximum distances between neighboring participants (i.e., participants that are next to one another) within a group or the maximum distances between each participant within a group and the corresponding center of that group. The clustering cost could be directly proportional to the distance between participants within a group. Thus, a clustering cost increases as the distance between participants within a group increases. The K cost is associated with the number of groups utilized. As K increases, the number of groups increases, and, thus, the K cost increases. The preference, when possible, is for fewer groups so as to reduce the need to switch camera views between groups when the active speaker switches between participants of different groups. The endpoint selects the candidate solution with the lowest calculated cost. In some instances, however, the video conference endpoint compares the calculated cost with a predetermined threshold value. If the calculated cost of the candidate solution with the lowest calculated cost is above the predetermined threshold, then the video conference endpoint may not utilize group framing techniques, and may, instead, utilize traditional close-up framing techniques.

Figure 6:
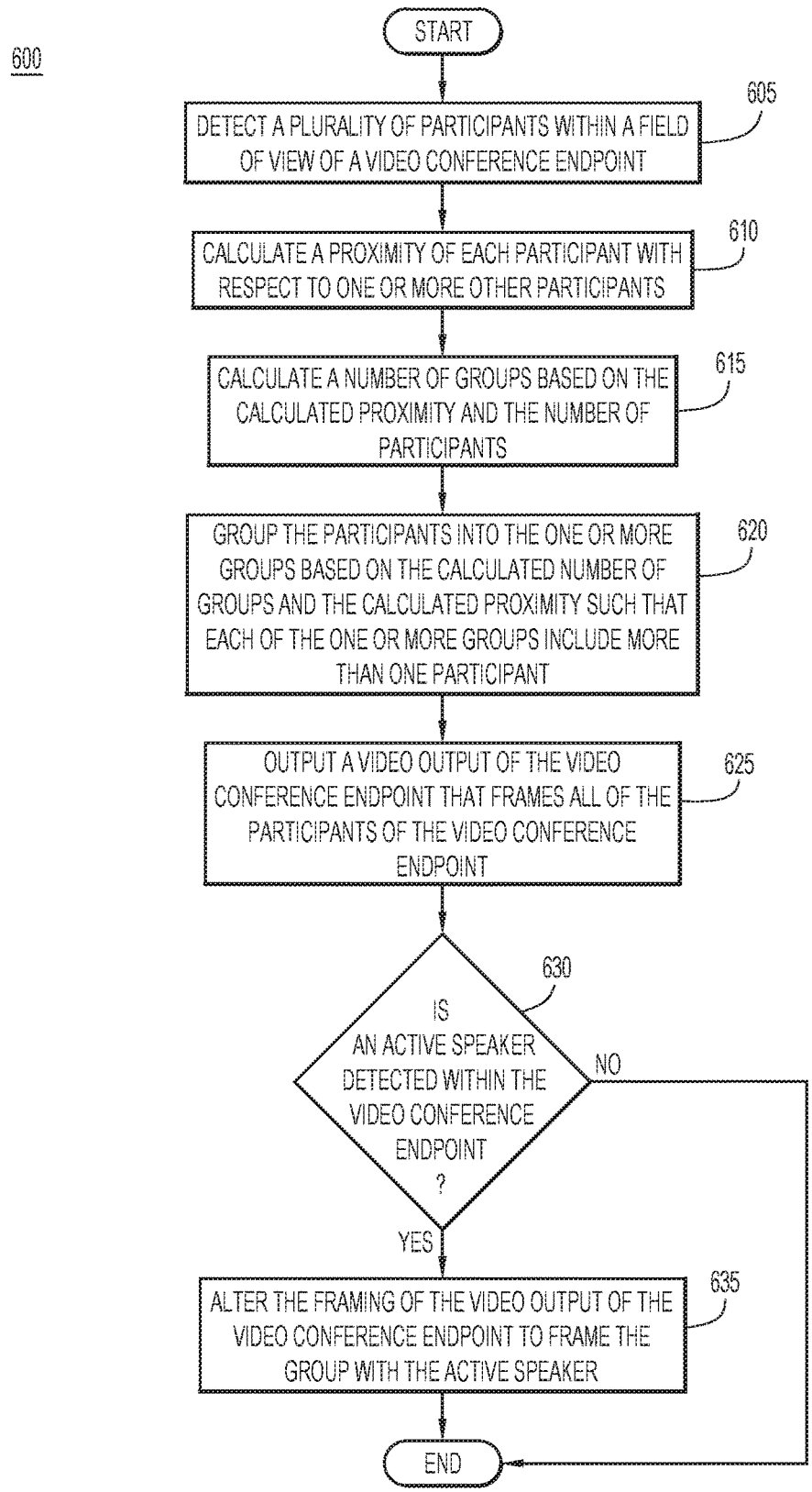
FIG. 6 is a flowchart depicting the operations of the group framing techniques, according to an example embodiment.

With reference to FIG. 6, and continued reference to FIGS. 1-5, there is depicted a flowchart of an example method 600 of grouping the participants of a video conference endpoint and switching the framing of the video output of the cameras to a group of participants upon detection of an active speaking participant with the microphone array. Initially, at 605, the video conference endpoint 104 detects, based on a video output from the cameras 112A and/or 112B, a plurality of participants within a field of view of the video cameras 112A and/or 112B. As previously explained, the video conference endpoint 104 may detect participants utilizing facial recognition techniques, upper body recognition techniques, and/or motion detection techniques on the video output of the cameras 112. At 610, the video conference endpoint 104, based on the detected participants of the video conference endpoint 104, calculates the proximity or distance of each participant with respect to the other participants 106. As previously explained, the video conference endpoint 104 may utilize techniques (e.g., face detection, upper body detection, motion detection, audio triangulation, etc.) on the outputs (e.g., audio, video, etc.) of the speaker tracking system (e.g., microphone array 118, video cameras 112A and/or 112B) to build a representation of the position of each of the participants within or near a video conference endpoint 104. From this representation, the video conference endpoint 104 may determine the distance or proximity of each participant with respect to the other participants. The video conference endpoint 104 then, at 615, calculates the best or most suitable number of groups in which to group the participants of the video conference endpoint 104, for example, using a clustering algorithm. As explained above, the endpoint may use the clustering algorithm to calculate the number of groups by factoring into the calculation the number of participants and the proximity of, or distance between, the participants, among other factors.

At 620, the video conference endpoint 104 then assigns each of the participants into a group based on the calculated number of groups, the proximity between respective the participants, and a condition/requirement that each group must contain more than one participant. Thus, as illustrated in the example of FIG. 4, participants 106(1) and 106(2) are grouped into a first group associated with framing 400, while participants 106(3) and 106(4) are grouped into a second group associated with framing 410. Similarly, as illustrated in the example of FIG. 5, participants 106(1) and 106(2) are grouped into a first group associated with framing 500, participants 106(3) and 106(4) are grouped into a second group associated with framing 510, and participants 106(5) and 106(6) are grouped into a third group associated with framing 520. Returning to FIG. 6, at 625, the video conference endpoint 104 supplies/generates a video output from the cameras 112A and/or 112B to a far-end endpoint (either directly or through a conference server), where the video output is framed to include all, or the majority of, the participants of the video conference endpoint 104.

At 630, the video conference endpoint 104 determines whether one of the participants at the video conference endpoint 104 is an active speaking participant. The video conference endpoint 104 may make this determination based on outputs from the microphone array 118. If, at 630, one of the participants of the video conference endpoint 104 is determined to be an active speaking participant, then, at 635, the video conference endpoint 104 alters/modifies the framing of the video output of the cameras 112A and 112B to frame the group of participants that contains the active speaking participant, such as according to the examples depicted in FIGS. 4 and 5. As illustrated in the example of FIG. 5, if participant 106(1) or participant 106(2) is determined to be the active speaker of video conference endpoint 104, then the endpoint 104 alters the framing of the video output to be the framing 500. As previously explained, if participant 106(1) or participant 106(2) is determined to be the active speaker, the endpoint 104 changes the video output to frame only participants 106(1) and 106(2) (e.g., participants 106(3)-106(6) are not shown). Furthermore, as illustrated in the example of FIG. 5, if participant 106(3) or participant 106(4) is determined to be the active speaker of video conference endpoint 104, then the endpoint changes the framing of the video output to be the framing 510. As previously explained, if participant 106(3) or participant 106(4) is determined to be the active speaker, the endpoint changes the video output to frame only participants 106(3) and 106(4) (i.e., participants 106(1), 106(2), 106(5), and 106(6) are not shown). In addition, as illustrated in the example of FIG. 5, if participant 106(5) or participant 106(6) is determined to be the active speaker of video conference endpoint 104, then the endpoint changes the framing of the video output to be the framing 520. As previously explained, if participant 106(5) or participant 106(6) is determined to be the active speaker, the endpoint changes the video output to frame only participants 106(5) and 106(6) (participants 106(1)-106(4) are not shown).

However, if, at 630, none of the participants of the video conference endpoint 104 is determined to be an active speaker, then the video conference endpoint 104 does not alter the framing of the video output of the cameras 112A and/or 112B. Thus, the video output of the cameras 112A and/or 112B of the video conference endpoint 104 remains being framed to include all, or the majority of, the participants of the video conference endpoint 104.

Conversational Framing

During a video conference, discussions often occur between participants that are located at the same video conference endpoint (i.e., participants that are local to the video conference endpoint are conversing with one another). With current speaker tracking systems that frame an active speaker with a close-up framing, as illustrated in FIG. 3, discussions between participants located at the same video conference endpoint (e.g., discussions between participants located within the same room 200) results in a series of switches between various close-up framings. This constant switching of camera views/framings is distracting to far-end participants. Moreover, when framing the active speaker of a video conference endpoint with only a close-up framing, the participant being addressed by the active speaker is not present in the close-up framing. Not being able to see the reactions of the participant being addressed reduces the far-end participants' contextual understanding of the discussion.

Figure 7:
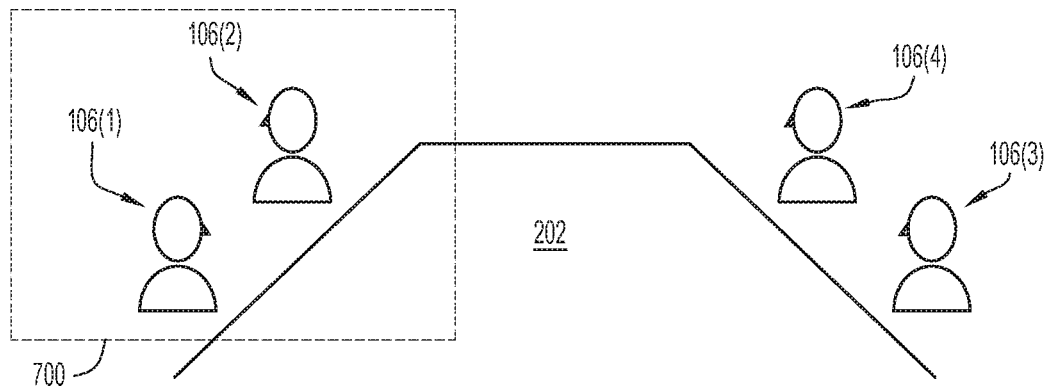
FIGS. 7 and 8 show examples of conversational framing techniques, according to an example embodiment.

In one solution presented herein, a method for framing nearby participants that are involved in a discussion is provided. With reference to FIG. 7 and continued reference to FIGS. 1 and 2, participants 106(1)-106(4) are seated around table 202 of a video conference endpoint 104, where participants 106(1) and 106(2) are seated across the table 202 from participants 106(3) and 106(4). It is to be understood that FIG. 7 is drawn to a scale that purposefully and intentionally conveys the relative distances/proximities between each of the participants 106(1)-106(4) around table 202. As illustrated in FIG. 7, participants 106(1) and 106(2) are facing one another and conversing (i.e., conducting a discussion) with each other. Furthermore, participants 106(3) and 106(4) are facing the two participants 106(1) and 106(2) that are having a conversation with each other. When the discussion between participant 106(1) and participant 106(2) occurs, the video conference endpoint 104 selects framing 700 to show both conversing participants 106(1) and 106(2), instead of switching between a close-up framing of each of the conversing participants 106(1) and 106(2) or outputting a framing of all of the participants (i.e., participants 106(1)-106(4)) at the video conference endpoint 104. In other words, when participant 106(1) and participant 106(2) of FIG. 7 are conducting a discussion between one another, the video conference endpoint 104 switches from a framing showing all of the participants 106(1)-106(4) to framing 700 that shows the local discussion between the two conversing participants 106(1) and 106(2) while simultaneously excluding, or not showing, the non-conversing participants 106(3) and 106(4). This technique is generally referred to as "conversational framing".

Figure 8:
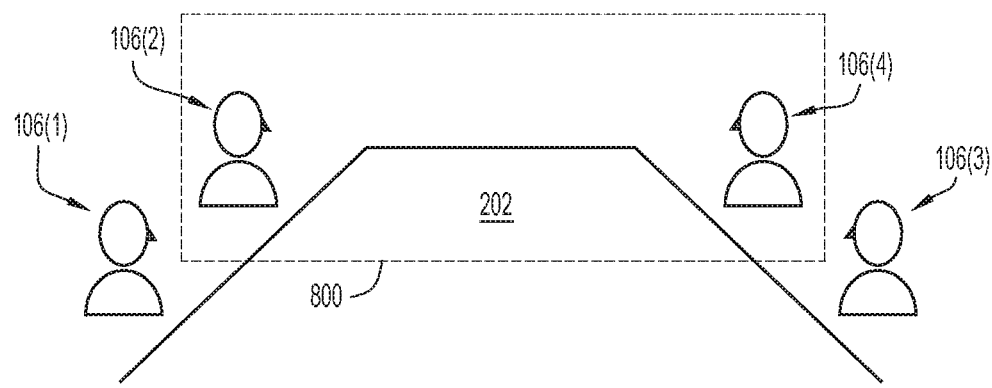

With reference to FIG. 8 and continued reference to FIGS. 1, 2, and 7, participants 106(1)-106(4) are seated around table 202 of the video conference endpoint 104, similar to that illustrated in FIG. 7, where participants 106(1) and 106(2) are seated across the table 202 from participants 106(3) and 106(4). It is to be understood that FIG. 8 is drawn to a scale that purposefully and intentionally conveys the relative distances/proximities between each of the participants 106(1)-106(4) around table 202. However, unlike the example of FIG. 7, in FIG. 8 participants 106(2) and 106(4) are facing and conversing (i.e., conducting a discussion) with one another across table 202. Furthermore, participants 106(1) and 106(3) are facing the two conversing participants 106(3) and 106(4) as shown in FIG. 8. When a discussion between participant 106(2) and participant 106(4) is occurring, the video conference endpoint 104 selects framing 800 that shows both conversing participants 106(2) and 106(4), instead of switching between close-up framings of each of the respective conversing participants 106(2) and 106(4) or outputting a framing of all of the participants (i.e., participants 106(1)-106(4)) at the video conference endpoint 104. In other words, when participant 106(2) and participant 106(4) of FIG. 8 are having a discussion with each other, the video conference endpoint 104 switches from a framing showing all of the participants 106(1)-106(4) at the video conference endpoint to framing 800 showing the local discussion between the two conversing participants 106(2) and 106(4) while simultaneously excluding, or not showing, the non-conversing participants 106(1) and 106(3). Although participants 106(2) and 106(4) are seated across table 202 from one another, the endpoint determines that the two participants 106(2) and 106(4) are located within a sufficient proximity to one another that the video conference endpoint 104 can group them together in a framing from the video output of the cameras 112A and/or B to include only the two conversing participants 106(2) and 106(4).

However, if participants 106(2) and 106(3) are conversing with one another, the video conference endpoint 104 would not be able to frame the two conversing participants 106(2) and 106(3) because the two participants 106(2) and 106(3) are not in close enough proximity to one another such that the video conference endpoint 104 could frame the conversing participants 106(2) and 106(3). Similarly, if participants 106(1) and 106(4) are conversing with one another, the video conference endpoint 104 would not be able to frame the two conversing participants 106(1), 106(4) because the two participants 106(1) and 106(4) are not in close enough proximity to one another that the video conference endpoint 104 could frame the conversing participants 106(1), 106(4).

Figure 9:
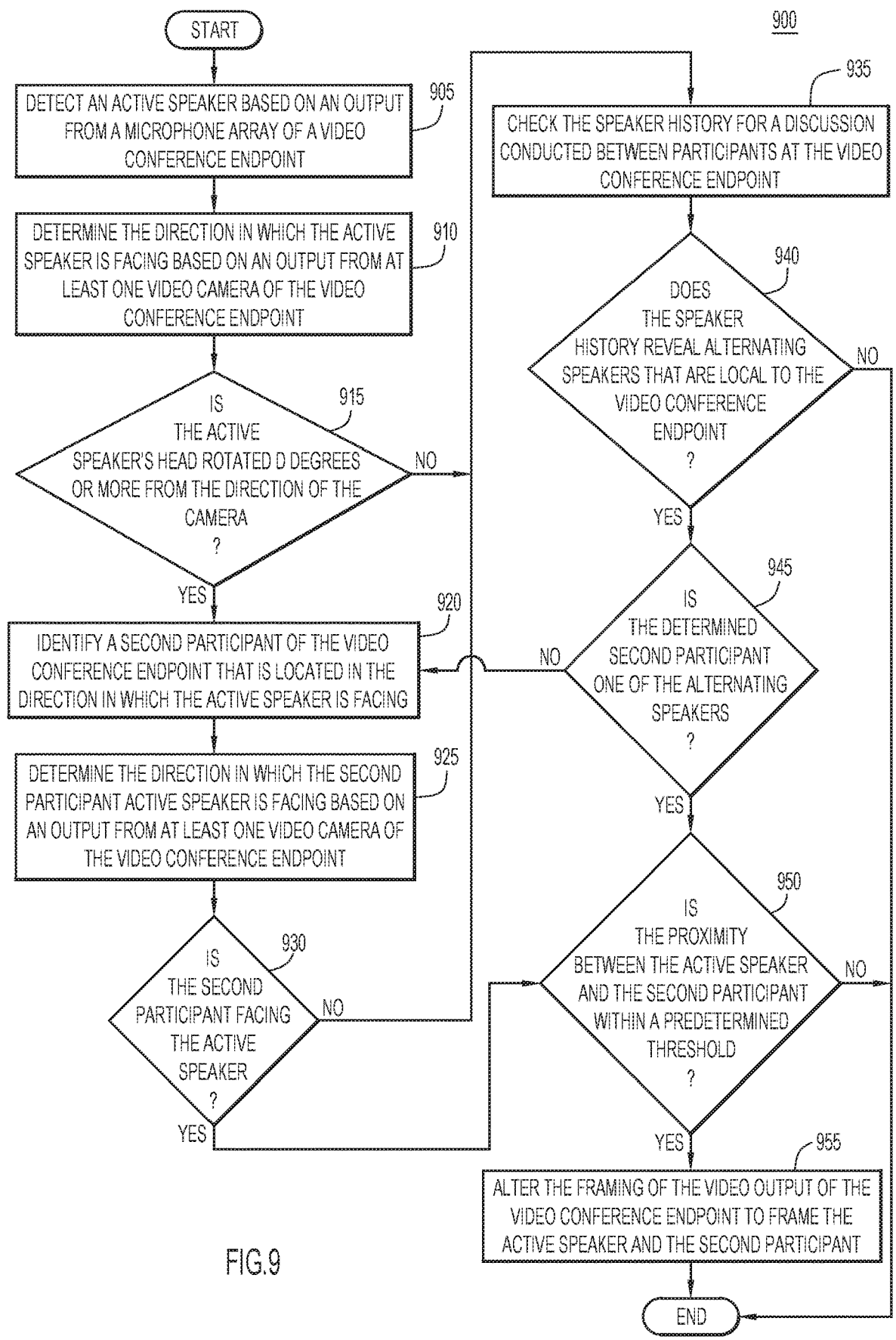
FIG. 9 is a flowchart depicting the operations of the conversational framing techniques according to an example embodiment.

With reference to FIG. 9, and continued reference to FIGS. 1, 2, 7, and 8, depicted is a flowchart of an example method 900 of conversational framing of the video output of the cameras of a video conference endpoint to include only the participants of that are conducting a discussion. Initially, at 905, the video conference endpoint 104 detects, based on an output from the microphone array 118, an active speaking participant at the video conference endpoint 104. As previously explained, the active speaking participant may be one of the participants located at the video conference endpoint 104. At 910, the video conference endpoint 104 determines the direction in which the active speaking participant is facing. The video conference endpoint 104 may utilize facial recognition and/or gaze detection techniques on a video output from the cameras 112A and/or 112B of the video conference endpoint 104 to determine the direction in which the active speaking participant is facing. The video conference endpoint 104 may determine or approximate the rotational facing direction of the active speaking participant in relation to the direction in which the cameras 112A and/or 112B are facing, where the amount of rotation may be quantified in degrees.

At 915, the video conference endpoint 104 determines whether the active speaking participant's head it rotated more than D degrees from the direction in which the cameras 112A and/or 112B are facing. In one embodiment, the video conference endpoint 104 determines whether or not the active speaking participant's head is rotated 30 degrees or more from the direction in which the cameras 112A and/or 112B are facing. This determination enables the video conference endpoint 104 to establish if the active speaking participant is looking at another participant of the video conference endpoint 104 while speaking. If, at 915, the video conference endpoint 104 determines that the active speaking participant's head is rotated "D" degrees or more, then, at 920, the video conference endpoint 104 identifies a second participant at the video conference endpoint 104 that is located in the direction in which the active speaking participant is facing. The video conference endpoint 104 may utilize facial recognition techniques on the video output from the cameras 112 of the video conference endpoint 104 to determine the second participant 106. In addition, at 925, the video conference endpoint 104 determines the direction in which the second participant is facing. The video conference endpoint 104 may utilize facial recognition and/or gaze detection techniques of a video output from the cameras 112A and/or 112B of the video conference endpoint 104 to determine the direction the second participant is facing. The video conference endpoint 104 may determine or approximate the rotation of the head of the second participant in relation to direction in which the cameras 112A and/or 112B are facing, where the amount of rotation may be quantified in degrees.

At 930, the video conference endpoint 104 determines if the second participant is facing the active speaking participant. If it is determined, at 930, that the second participant is facing the active speaking participant, then, at 950, the video conference endpoint 104 determines if the proximity between the active speaking participant and the second participant is within a predetermined threshold. As previously explained, the video conference endpoint 104 may detect participants and determine distances between participants utilizing facial recognition techniques, upper body recognition techniques, and/or motion detection techniques on the video output of the cameras 112. Once participants 106 are detected, the video conference endpoint 104 may then calculate the distance between, or proximity of, one participant with respect to the other participants at the video conference endpoint 104. If, at 950, the proximity between the active speaking participant and the second participant is within a predetermined threshold, then, at 955, the video conference endpoint 104 alters the framing of the video output of the cameras 112A and/or 112B to frame only the active speaking participant and the second participant.

However, if, at 950, the video conference endpoint 104 determines that the proximity between the active speaking participant and the second participant exceeds the predetermined threshold, then the video conference endpoint 104 either alters the framing to be a traditional close-up framing of the active speaking participant or does not alter the framing of the video output of the cameras 112A and/or 112B (i.e., the video output of the cameras 112 of the video conference endpoint 104 remains framed to include all, or the majority of, the participants of the video conference endpoint 104). As previously explained, proximity between participants 106 is the proximity of one participant with respect to each of the other participants at the video conference endpoint 104. For example, with reference to FIG. 8, if participants 106(2) and 106(3) were conversing with one another, or if participants 106(1) and 106(4) were conversing with one another, the video conference endpoint 104 at 950 would determine that the participants participating in the discussion would not be in close enough proximity to one another to frame the two conversing participants without including the non-conversing participants.

Returning to 915, if the video conference endpoint 104 determines that the head of the active speaking participant is not rotated D degrees or more with respect to the cameras 112A and/or 112B, then, at 935, the video conference endpoint 104 reviews a speaker history to determine if a discussion is being conducted between participants at the video conference endpoint 104. As previously explained, the video conference endpoint 104, through the combination of microphone array 118 and video cameras 112A and/or 112B, is capable of identifying speaking participants. During a video conference session, the video conference endpoint 104 continuously records the identity of a speaking participant, the time at which a speaking participant began speaking, and the duration the speaking participant was speaking. The video conference endpoint 104 stores this information as the speaker history. In addition, if, at 915, the video conference endpoint 104 determines that the head of the active speaking participant is rotated more than D degrees, but, at 930, the video conference endpoint 104 determines that the second participant is not facing the active speaking participant, then, at 935, the video conference endpoint 104 reviews the speaker history to determine if a discussion is being conducted between participants at the video conference endpoint 104. At 940, the video conference endpoint 104 determines whether the speaker history contains a recent record of alternating active speakers at the video conference endpoint 104. If, at 940, the speaker history reveals alternating speakers to the video conference endpoint 104, then the video conference endpoint 104, at 945, determines if at least one of the alternating active speakers of the speaker history record is the second participant identified at 920. If, at 945, the speaker history does not reveal the second participant as one of the alternating speakers, then the video conference endpoint 104 returns to 920 to identify another participant at the video conference endpoint 104 that is located in the direction in which the active speaking participant is facing. However, if, at 945, the identified second participant is one of the alternating speakers of the speaker history, then the video conference endpoint 104 continues to 950 to determine if the proximity between the active speaking participant and the second participant is within a predetermined threshold. However, if, at 940, the speaker history does not reveal alternating speakers, then the video conference endpoint 104 either alters the framing to be a traditional close-up framing of the active speaking participant or does not alter the framing of the video output of the cameras 112A and/or 112B.

Figure 10:
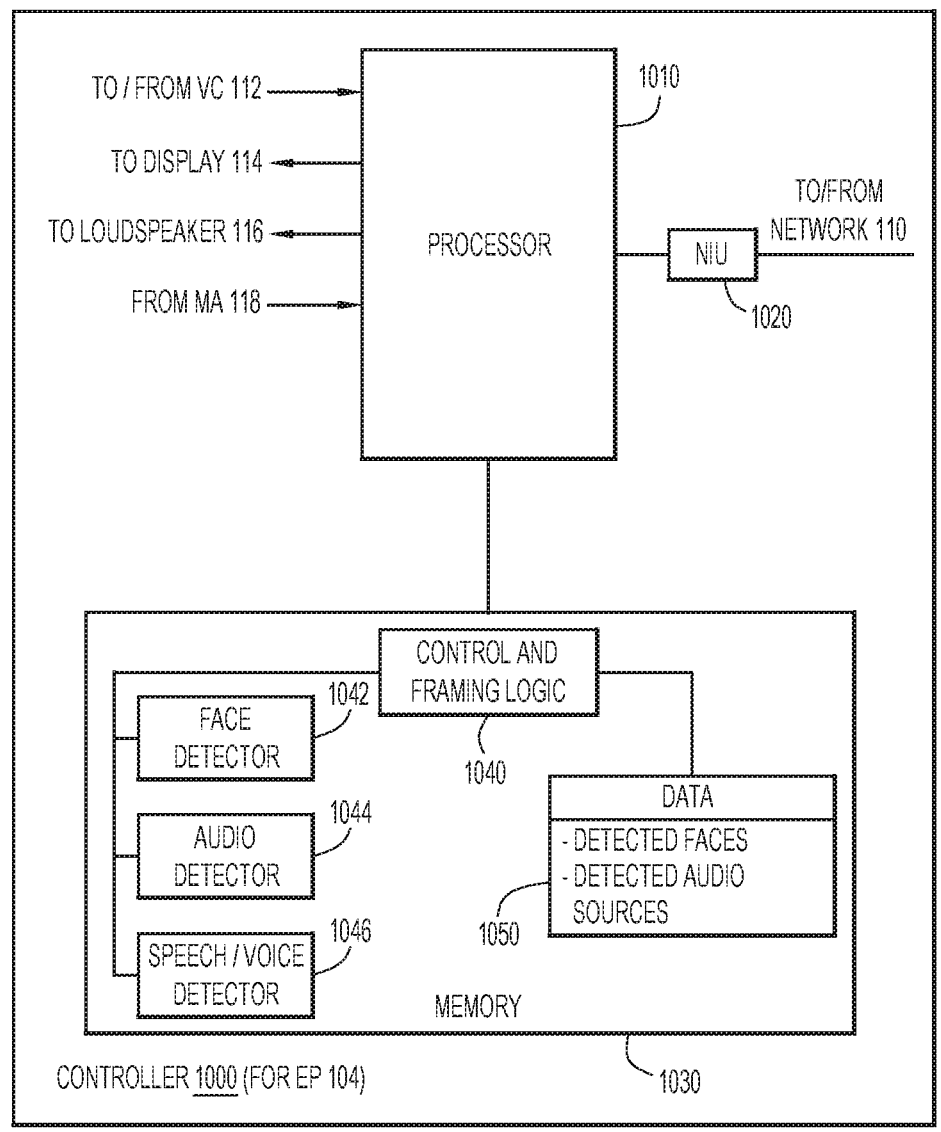
FIG. 10 is a block diagram of a controller of the video conference endpoint, wherein the controller is configured to perform the group and conversational framing techniques, according to an example embodiment.

Reference is now made to FIG. 10, which shows an example block diagram of a controller 1000 of video conference endpoint 104 configured to perform the framing techniques according to embodiments described herein. There are numerous possible configurations for controller 1000 and FIG. 10 is meant to be an example. Controller 1000 includes a processor 1010, a network interface unit 1020, and memory 1030. The network interface (I/F) unit (NIU) 1020 is, for example, an Ethernet card or other interface device that allows the controller 1000 to communicate over communication network 110. Network I/F unit 1020 may include wired and/or wireless connection capability.

Processor 1010 may include a collection of microcontrollers and/or microprocessors, for example, each configured to execute respective software instructions stored in the memory 1030. The collection of microcontrollers may include, for example: a video controller to receive, send, and process video signals related to display 114 and video cameras 112; an audio processor to receive, send, and process audio signals related to loudspeaker 116 and MA 118; and a high-level controller to provide overall control. Processor 1010 may send pan, tilt, and zoom commands to video cameras 112, which is responsive to the commands as would be appreciated by one of ordinary skill in the relevant arts. Portions of memory 1030 (and the instruction therein) may be integrated with processor 1010. In the transmit direction, processor 1010 encodes audio/video captured by MA 118/VC 112, encodes the captured audio/video into data packets, and causes the encoded data packets to be transmitted to communication network 110. In a receive direction, processor 1010 decodes audio/video from data packets received from communication network 110 and causes the audio/video to be presented to local participants via loudspeaker 116/display 114. As used herein, the terms "audio" and "sound" are synonymous and interchangeably.

The memory 1030 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1030 may comprise one or more computer readable storage media (e.g., a memory device) encoded with software comprising computer executable instructions and when the software is executed (by the processor 1010) it is operable to perform the operations described herein. For example, the memory 1030 stores or is encoded with instructions for Control and Framing logic 1040 to perform overall control of endpoint 104 and operations described herein for switching between different views. Control and Framing logic 1040 includes a Face Detector 1042 to detect faces and face positions/facing directions based on captured video, an Audio Detector 1044 to detect positions of active audio sources (e.g., talkers, active speakers, etc.) based on the detected audio, and a Speech/Voice Detector 1046 to identify portions of detected audio as well as to identify speaking participants.

In addition, memory 1030 stores data 1050 used and generated by logic/detectors 1040-1046, including, but not limited to: information associated with detected faces (e.g., positions, confidence levels, stored detected faces, facing directions and the like); information associated with detected active audio sources (e.g., positions of speakers); information associated with speaker histories (e.g., which participants were speaking, when specific participants were speaking, etc.); information defining speaker clusters from received audio sources, and information representing participant groupings.

Figure 11:
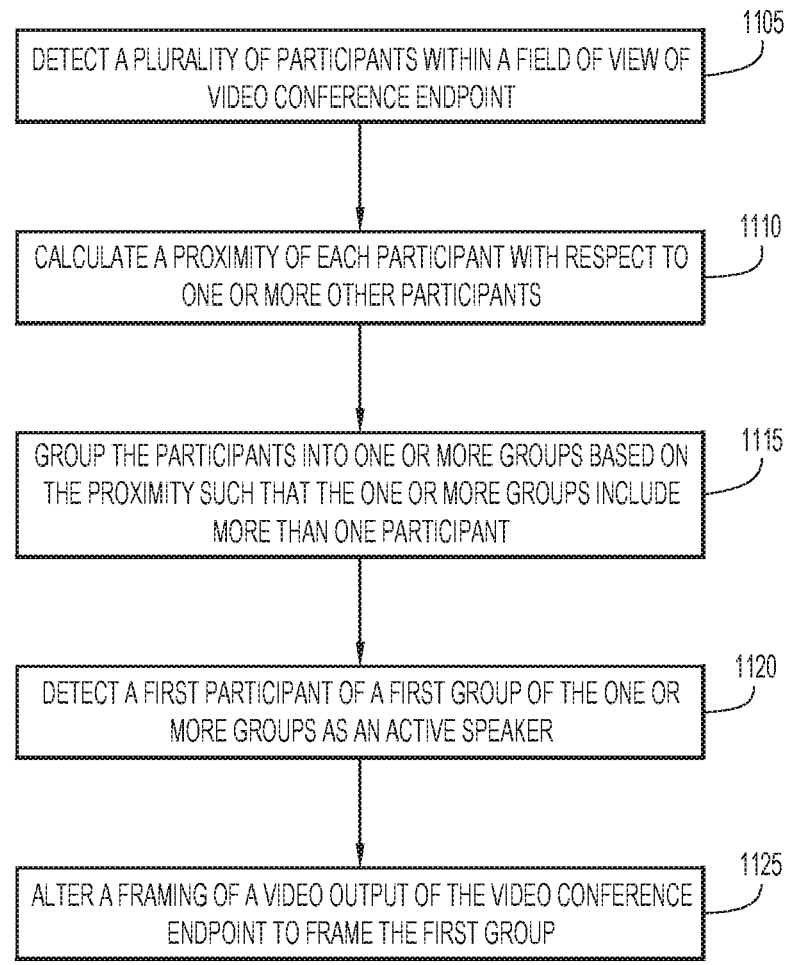
FIG. 11 is a flowchart of a method of altering the framing of a video output of a video conference endpoint, according to an example embodiment.

With reference to FIG. 11, illustrated is a flowchart of a method 1100 performed by the video conference endpoint for grouping participants at a video conference endpoint and framing the video output of one or more cameras to a group of participants when that group contains an active speaker. Reference is also made to FIGS. 1-5 for purposes of the description of FIG. 11. At 1105, the video conference endpoint 104 detects, via the cameras 112A and/or 112B, the plurality of participants at a video conference endpoint 104. As illustrated in FIG. 2, the participants 106 may be disposed within a conference room 200, and disposed around a table 202 within the conference room 200. The video conference endpoint 104 may detect the participants by using one or more of face detection, gaze detection, upper body detection, or motion detection techniques on the output of least one video camera 112 of the video conference endpoint 104. At 1110, the video conference endpoint 104 calculates the proximity of each participant with respect to one or more other participants at the video conference endpoint 104. In other words, the video conference endpoint 104 may calculate the distance between one participant and each of the other participants at the video conference endpoint 104 using the output of the cameras 112A and/or 112B. At 1115, the video conference endpoint 104 groups the participants into one or more groups based on the calculated proximity. As explained previously, the video conference endpoint may utilize a clustering algorithm to determine both the number of the one or more groups, and which participants to include within each of the one or more groups, where the clustering algorithm bases the determination on the calculated proximity of each participant.

At 1120, the video conference endpoint 104 detects a first participant of a first group of one of the more groups as an active speaker. The video conference endpoint 104 may detect the active speaker based on output from a microphone array of the video conference endpoint 104. Upon detection of the active speaker, the video conference endpoint 104 then, at 1125, alters the framing of the video output of the cameras 112 to frame the group that contains the active speaker. The framing of the video output of the cameras 112 may be altered from a framing that includes all of the participants of the video conference endpoint 104 to a framing that includes only the participants of a specific group, where the group contains the detected active speaker.

In summary, current speaker tracking solutions frame the current speaker without regards to context (i.e. nearby participants). According to one embodiment, presented herein is a method to intelligently frame groups of participants in a meeting. This gives a more meaningful experience with fewer switches, better contextual understanding, and a more natural framing, as would be seen in a video production made by a human director.

Psychologically, people tend to group nearby objects and people, and see them as single units. This is partly done to reduce perceived complexity. With the solutions presented herein, this tendency is accounted for by showing groups of participants, which reduces mental load and gives a more aesthetically pleasing and natural experience to far-end participants. Seeing both the speaker and nearby participants in a close-up framing provides improved participation value, by showing the facial expressions of the active talker and the local participants who are engaged in the discussion with the active talker. This also improves the contextual understanding. Every view switch results in a visual discontinuity, as well as encoding artifacts, increasing the mental load of far-end participants. Grouping participants according to the techniques presented herein, however, reduces the number of necessary view switches to show the active speaker.

Furthermore, in accordance with another embodiment, conversational framing techniques are provided. During speaker tracking, when two local participants are addressing each other, a method is provided to select a close-up framing showing both participants. By evaluating the direction participants are looking and the speaker history, it can be determined if there is a local discussion occurring, and thus an appropriate framing can be selected to give far-end endpoints the most contextually rich experience. Framing both the speaker and the person that is being addressed in a close-up view provides a better user experience, by showing the facial expressions of the active talker and the person to whom the active talker is speaking. This also improves the contextual understanding. For example, showing a combined framing of two people in a "heated" discussion reduces the number of camera view or framing switches to show the active speaker. Every switch results in a visual discontinuity, as well as encoding artifacts, increasing the mental load of far-end spectators.

In one form, a method is provided comprising: detecting a plurality of participants within a field of view of a video conference endpoint; calculating a proximity of each participant with respect to one or more other participants; grouping the participants into one or more groups based on the proximity such that the one or more groups include more than one participant; detecting a first participant of a first group of the one or more groups as an active speaker; and altering a framing of a video output of the video conference endpoint to frame the first group.

In another form, an apparatus is provided comprising: a network interface unit that enables communication over a network; and a processor coupled to the network interface unit, the processor configured to: detect a plurality of participants within a field of view of a video conference endpoint; calculate a proximity of each participant with respect to one or more other participants; group the participants into one or more groups based on the proximity such that the one or more groups include more than one participant; detect a first participant of a first group of the one or more groups as an active speaker; and alter a framing of a video output of the video conference endpoint to frame the first group.

In yet another form, a non-transitory processor readable medium is provided. The medium stores instructions that, when executed by a processor, cause the processor to: detect a plurality of participants within a field of view of a video conference endpoint; calculate a proximity of each participant with respect to one or more other participants; group the participants into one or more groups based on the proximity such that the one or more groups include more than one participant; detect a first participant of a first group of the one or more groups as an active speaker; and alter a framing of a video output of the video conference endpoint to frame the first group.

In sum, the techniques presented herein bring speaker tracking closer to what a human director of a video would produce.

The above description is intended by way of example only. Various modifications and structural changes may be made therein without departing from the scope of the concepts described herein and within the scope and range of equivalents of the claims.

What is claimed is:

1. A method comprising:
    detecting, by a video conference endpoint, a first participant of a plurality of participants within a field of view of a video camera of the video conference endpoint as an active speaker;
    determining, by the video conference endpoint, if the first participant is facing a second participant of the plurality of participants based on an output of the video camera of the video conference endpoint by determining if a head of the first participant is rotated a number of degrees from the video camera of the video conference endpoint, and determining whether the number of degrees is greater than a predetermined number of degrees;
    analyzing, by the video conference endpoint, a speaker history to determine if the second participant of the plurality of participants was a previous active speaker;
    if the second participant was the previous active speaker, determining, by the video conference endpoint, from the speaker history whether the first participant and the second participant are alternating active speakers; and
    if the first participant and the second participant are alternating active speakers, altering, by the video conference endpoint, a framing of the output of the video camera of the video conference endpoint to frame the first participant and the second participant.

2. The method of claim 1, further comprising:
    calculating, by the video conference endpoint, a proximity between the first participant and the second participant.

3. The method of claim 2, wherein altering the framing of the output of the video camera further comprises:
    altering, by the video conference endpoint, the framing of the output of the video camera of the video conference endpoint to frame the first participant and the second participant when the proximity between the first participant and the second participant is within a predetermined threshold.

4. The method of claim 1, wherein if the second participant was not the previous active speaker, further comprising:
    determining, by the video conference endpoint, if the first participant is facing a third participant of the plurality of participants based on the output of the video camera of the video conference endpoint.

5. The method of claim 1, wherein the speaker history includes an identity of the active speaker and the previous active speaker, a time at which the active speaker and the previous active speaker began speaking, and a duration in which the active speaker and the previous active speaker were speaking.

6. The method of claim 1, wherein prior to analyzing the speaker history, further comprising:
    determining, by the video conference endpoint, if the second participant is facing the first participant of the plurality of participants based on the output of the video camera of the video conference endpoint.

7. The method of claim 6, wherein determining if the second participant is facing the first participant further comprises:
    determining if a head of the second participant is rotated a number of degrees from the video camera of the video conference endpoint, and whether the number of degrees is greater than a predetermined number of degrees.

8. An apparatus comprising:
    a network interface unit that enables communication over a network; and
    a processor coupled to the network interface unit, the processor configured to:
        detect a first participant of a plurality of participants within a field of view of a video camera of a video conference endpoint as an active speaker;
        determine if the first participant is facing a second participant of the plurality of participants based on an output of the video camera of the video conference endpoint by determining if a head of the first participant is rotated a number of degrees from the video camera of the video conference endpoint, and determining whether the number of degrees is greater than a predetermined number of degrees;
        analyze a speaker history to determine if the second participant of the plurality of participants was a previous active speaker;
        if the second participant was the previous active speaker, determine from the speaker history whether the first participant and the second participant are alternating active speakers; and
        if the first participant and the second participant are alternating active speakers, alter a framing of the output of the video camera of the video conference endpoint to frame the first participant and the second participant.

9. The apparatus of claim 8, wherein the processor is further configured to:
    calculate a proximity between the first participant and the second participant.

10. The apparatus of claim 9, wherein, when altering the framing of the output of the video camera, the processor is further configured to:
    alter the framing of the output of the video camera of the video conference endpoint to frame the first participant and the second participant when the proximity between the first participant and the second participant is within a predetermined threshold.

11. The apparatus of claim 8, wherein, if the second participant is not the previous active speaker, the processor is further configured to:
   determine if the first participant is facing a third participant of the plurality of participants based on the output of the video camera of the video conference endpoint.

12. The apparatus of claim 8, wherein the speaker history includes an identity of the active speaker and the previous active speaker, a time at which the active speaker and the previous active speaker began speaking, and a duration the active speaker and the previous active speaker were speaking.

13. The apparatus of claim 8, wherein prior to the processor analyzing the speaker history, the processor is further configured to:
   determine if the second participant is facing the first participant of the plurality of participants based on the output of the video camera of the video conference endpoint.

14. The apparatus of claim 13, wherein, when determining if the second participant is facing the first participant, the processor is further configured to:
   determine if a head of the second participant is rotated a number of degrees from the video camera of the video conference endpoint, and whether the number of degrees is greater than a predetermined number of degrees.

15. A non-transitory processor readable medium storing instructions that, when executed by a processor, cause the processor to:
   detect a first participant of a plurality of participants within a field of view of a video camera of a video conference endpoint as an active speaker;
   determine if the first participant is facing a second participant of the plurality of participants based on an output of the video camera of the video conference endpoint by determining if a head of the first participant is rotated a number of degrees from the video camera of the video conference endpoint, and determining whether the number of degrees is greater than a predetermined number of degrees;
   analyze a speaker history to determine if the second participant of the plurality of participants was a previous active speaker;
   if the second participant was the previous active speaker, determine from the speaker history whether the first participant and the second participant are alternating active speakers; and
   if the first participant and the second participant are alternating active speakers, alter a framing of the output of the video camera of the video conference endpoint to frame the first participant and the second participant.

16. The non-transitory processor readable medium of claim 15, wherein the instructions, when executed by the processor, further cause the processor to:
   calculate a proximity between the first participant and the second participant.

17. The non-transitory processor readable medium of claim 16, wherein the instructions, when executed by the processor to alter the framing of the output of the video camera, further cause the processor to:
   alter the framing of the output of the video camera of the video conference endpoint to frame the first participant and the second participant when the proximity between the first participant and the second participant is within a predetermined threshold.

18. The non-transitory processor readable medium of claim 15, wherein, if the second participant was not the previous active speaker, the instructions, when executed by the processor, further cause the processor to:
   determine if the first participant is facing a third participant of the plurality of participants based on the output of the video camera of the video conference endpoint.

19. The non-transitory processor readable medium of claim 15, wherein, prior to analyzing the speaker history, the instructions, when executed by the processor, further cause the processor to:
   determine if the second participant is facing the first participant of the plurality of participants based on the output of the video camera of the video conference endpoint.

20. The non-transitory processor readable medium of claim 19, wherein the instructions, when executed by the processor to determine if the second participant is facing the first participant, further causes the processor to:
   determine if a head of the second participant is rotated a number of degrees from the video camera of the video conference endpoint, and whether the number of degrees is greater than a predetermined number of degrees.

* * * * *